(12) United States Patent
Chen et al.

(10) Patent No.: US 11,606,389 B2
(45) Date of Patent: Mar. 14, 2023

(54) ANOMALY DETECTION WITH GRAPH ADVERSARIAL TRAINING IN COMPUTER SYSTEMS

(71) Applicant: NEC Laboratories America, Inc., Princeton, NJ (US)

(72) Inventors: Zhengzhang Chen, Princeton Junction, NJ (US); Jiaping Gui, West Windsor Township, NJ (US); Haifeng Chen, West Windsor, NJ (US); Junghwan Rhee, Princeton, NJ (US); Shen Wang, Chicago, IL (US)

(73) Assignee: NEC Corporation

( * ) Notice: Subject to any disclaimer, the term of this patent is extended or adjusted under 35 U.S.C. 154(b) by 274 days.

(21) Appl. No.: 17/004,752

(22) Filed: Aug. 27, 2020

(65) Prior Publication Data

US 2021/0067549 A1 Mar. 4, 2021

Related U.S. Application Data

(60) Provisional application No. 62/893,313, filed on Aug. 29, 2019.

(51) Int. Cl.
*H04L 29/06* (2006.01)
*H04L 9/40* (2022.01)
*G06N 3/08* (2023.01)

(52) U.S. Cl.
CPC ........... *H04L 63/1466* (2013.01); *G06N 3/08* (2013.01); *H04L 63/1425* (2013.01); *H04L 63/20* (2013.01)

(58) Field of Classification Search
CPC . H04L 63/1466; H04L 63/1425; H04L 63/20; G06N 3/08; G06N 3/0454; G06N 3/084
See application file for complete search history.

(56) References Cited

U.S. PATENT DOCUMENTS

| 10,521,718 | B1 * | 12/2019 | Szegedy | G06N 3/084 |
| 10,587,632 | B1 * | 3/2020 | Perumalla | G06N 3/08 |
| 2019/0005386 | A1 * | 1/2019 | Chen | G06N 3/0454 |
| 2019/0095806 | A1 * | 3/2019 | Martinez Canedo | G06Q 10/04 |

(Continued)

OTHER PUBLICATIONS

Abolhasanzadeh, Bahareh. "Nonlinear dimensionality reduction for intrusion detection using auto-encoder bottleneck features." 2015 7th Conference on Information and Knowledge Technology (IKT). IEEE, 2015. (Year: 2015).*

(Continued)

*Primary Examiner* — Joseph P Hirl
*Assistant Examiner* — Ka Shan Choy
(74) *Attorney, Agent, or Firm* — Joseph Kolodka

(57) ABSTRACT

Methods and systems for detecting and responding to an intrusion in a computer network include generating an adversarial training data set that includes original samples and adversarial samples, by perturbing one or more of the original samples with an integrated gradient attack to generate the adversarial samples. The original and adversarial samples are encoded to generate respective original and adversarial graph representations, based on node neighborhood aggregation. A graph-based neural network is trained to detect anomalous activity in a computer network, using the adversarial training data set. A security action is performed responsive to the detected anomalous activity.

16 Claims, 10 Drawing Sheets

(56) References Cited

U.S. PATENT DOCUMENTS

| | | | | |
|---|---|---|---|---|
| 2019/0130110 | A1* | 5/2019 | Lee | G06F 21/57 |
| 2019/0286943 | A1* | 9/2019 | Leskovec | G06K 9/6257 |
| 2020/0175371 | A1* | 6/2020 | Kursun | G06N 3/0454 |
| 2020/0342290 | A1* | 10/2020 | Carothers | G06N 3/063 |
| 2020/0372353 | A1* | 11/2020 | Qin | G06K 9/6248 |

OTHER PUBLICATIONS

Dai et al., "Adversarial Attack on Graph Structured Data", arXiv:1806.02371v1 [cs.LG]. Jun 6, 2018. pp. 1-10.

Papernot et al., "Practical black-box attacks against machine learning", Proceedings of the 2017 ACM on Asia Conference on Computer and Communications Security arXiv:1602697v4. Mar. 19, 2017. pp. 1-14.

Zhu et al., "Robust Graph Convolutional Networks Against Adversarial Attacks", 25th ACM SIGKDD International Conference of Knowledge Discovery & Data Mining. Jul. 25, 2019. pp. 1399-1407.

Zugner et al., "Adversarial attacks on neural networks for graph data", proceedings of the 24th ACM SIGKDD International Conference on Knowledge Discovery & Data Mining. arXiv:1805.07984v3 [stat.ML]. Jun. 12, 2018. pp. 1-10.

Zugner et al., "Certifiable Robustness and Robust Training for Graph Convolutional Networks", arXiv:1906.12269v1 [cs LG] Jun. 28, 2019 pp. 1-11.

* cited by examiner

ANOMALY DETECTION WITH GRAPH ADVERSARIAL TRAINING IN COMPUTER SYSTEMS

RELATED APPLICATION INFORMATION

This application claims priority to 62/893,313, filed on Aug. 29, 2019, incorporated herein by reference herein its entirety.

BACKGROUND

Technical Field

The present invention relates to the detection of computer system anomalies, and, more particularly, to the use of machine learning systems with adversarial training that renders them resistant to attack.

Description of the Related Art

Automatic anomaly detection can be used for a wide variety of applications, providing a way to rapidly detect and respond to threats. However, these applications often have an intrinsic adversarial nature, where intelligent attackers can create adversarial samples to adaptively change the behavior of the machine learning system, allowing the attackers to avoid detection.

SUMMARY

A method for detecting and responding to an intrusion in a computer network includes generating an adversarial training data set that includes original samples and adversarial samples, by perturbing one or more of the original samples with an integrated gradient attack to generate the adversarial samples. The original and adversarial samples are encoded to generate respective original and adversarial graph representations, based on node neighborhood aggregation. A graph-based neural network is trained to detect anomalous activity in a computer network, using the adversarial training data set. A security action is performed responsive to the detected anomalous activity.

A system for detecting and responding to an intrusion in a computer network includes a hardware processor and a memory. A graph-based neural network model is configured to detect anomalous activity in a computer network. A model trainer, stored in the memory and executed by the hardware processor, is configured to generate an adversarial training data set that includes original samples and adversarial samples, by perturbing one or more of the original samples with an integrated gradient attack to generate the adversarial samples; to encode the original and adversarial samples to generate respective original and adversarial graph representations, based on node neighborhood aggregation; and to train the graph-based neural network to detect anomalous activity in a computer network, using the adversarial training data set. A security console configured to perform a security action responsive to the detected anomalous activity.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide an effective adversarial defense system to protect against adversarial attacks. In particular, graph neural networks (GNNs) may be trained to automatically detect adversarial sample attacks, improving the robustness of the GNNs by making it possible to separate adversarial samples from meaningful samples.

GNNs may be based, for example, on relatively unstructured data, and can be used to address discrete or categorical features, as the features and structures of graph data are often discrete. Adversarial contrastive learning is used to train over an adversarial space, addressing the problem of scarcity of training data in traditional supervised training.

Embodiments of the present invention can be applied in many different applications, for example including physical plant failure detection, financial market surveillance, autonomous vehicles, biometric authentication, and fraud detection. The present embodiments will be described in the context of intrusion detection in enterprise-scale computer network systems, but it should be understood that the present principles can be applied to any appropriate application.

Figure 1:
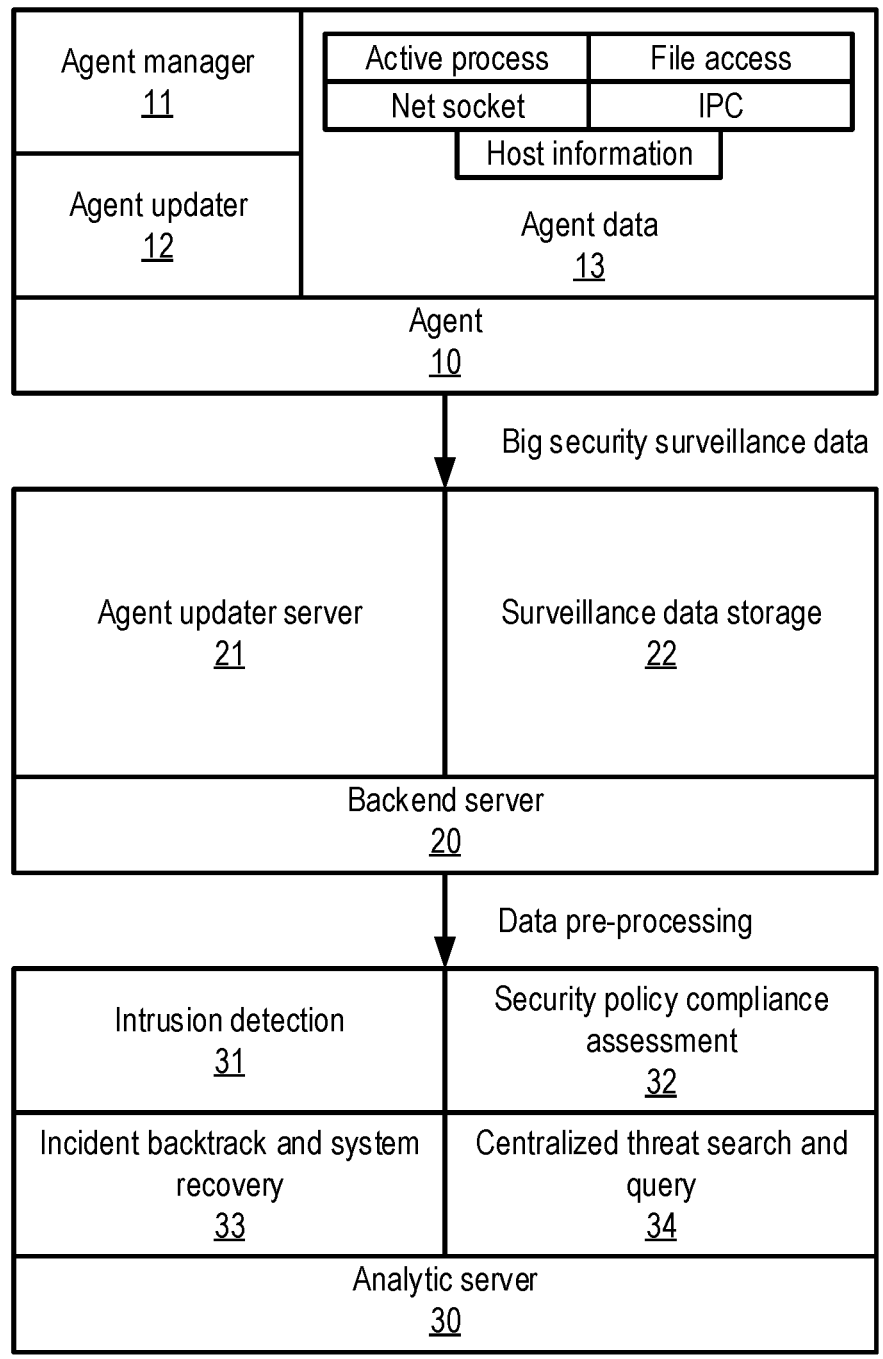
FIG. 1 is a block/flow diagram directed to an automatic security intelligence system architecture in accordance with the present principles.

Referring now in detail to the figures in which like numerals represent the same or similar elements and initially to FIG. 1, an automatic security intelligence system (ASI) architecture is shown. The ASI system includes three major components: an agent 10 is installed in each machine of an enterprise network to collect operational data; backend servers 200 receive data from the agents 10, pre-process the data, and sends the pre-processed data to an analysis server 30; and an analysis server 30 that runs the security application program to analyze the data.

Each agent 10 includes an agent manager 11, an agent updater 12, and agent data 13, which in turn may include information regarding active processes, file access, net sockets, number of instructions per cycle, and host information. The backend server 20 includes an agent updater server 21 and surveillance data storage. Analysis server 30 includes intrusion detection 31, security policy compliance assessment 32, incident backtrack and system recovery 33, and centralized threat search and query 34.

Figure 2:
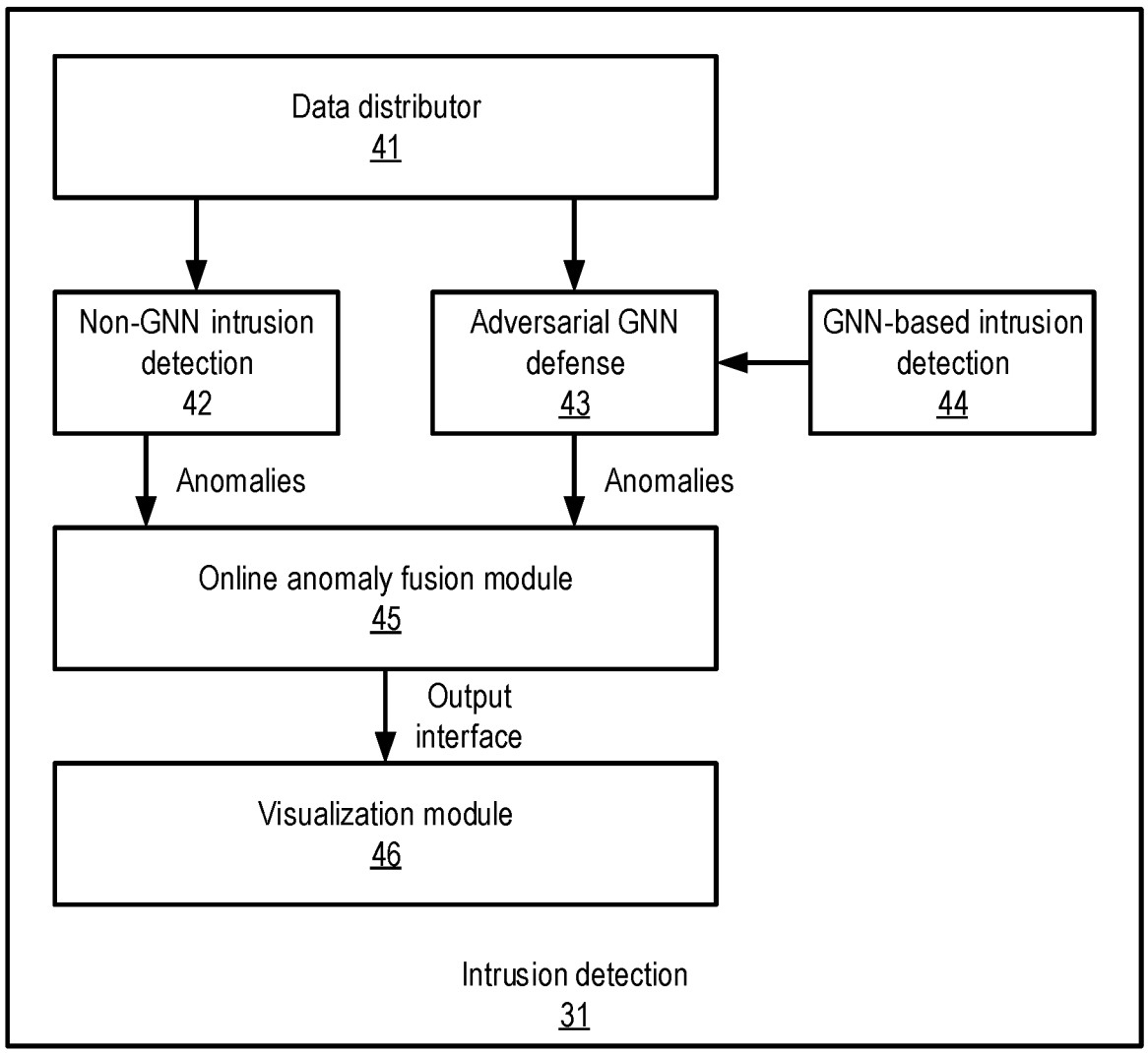
FIG. 2 is a block/flow diagram directed to an intrusion detection engine architecture in accordance with the present principles.

Referring now to FIG. 2, additional detail on intrusion detection 31 is shown. There are six modules in an intrusion detection engine: a data distributor 41 that receives the data from backend server 20 and distributes the corresponding information to non-GNN-based intrusion detection 42 and to adversarial GNN defense 43; non-GNN intrusion detection 42, which detects abnormal communication events using non-GNN detection systems; adversarial GNN defense 43, which provides adversarial training for GNN-based detection system 44; GNN-based intrusion detection 44, which uses a trained GNN to detect anomalous behavior in network gathered network information; anomaly fusion module 45 that integrates anomalies from both non-GNN and GNN-based systems and refines the results for trustworthy intrusion events; and visualization module 46 that outputs the detection results to end users.

The detectors that feed the intrusion detection system 31 may report alerts with very different semantics. For example, network detectors monitor the topology of network connections and report an alert if a suspicious client suddenly connects to a stable server. Meanwhile, process-file detectors may generate an alert if an unseen process accesses a sensitive file. The intrusion detection system 31 integrates alerts regardless of their respective semantics to overcome the problem of heterogeneity.

Figure 3:
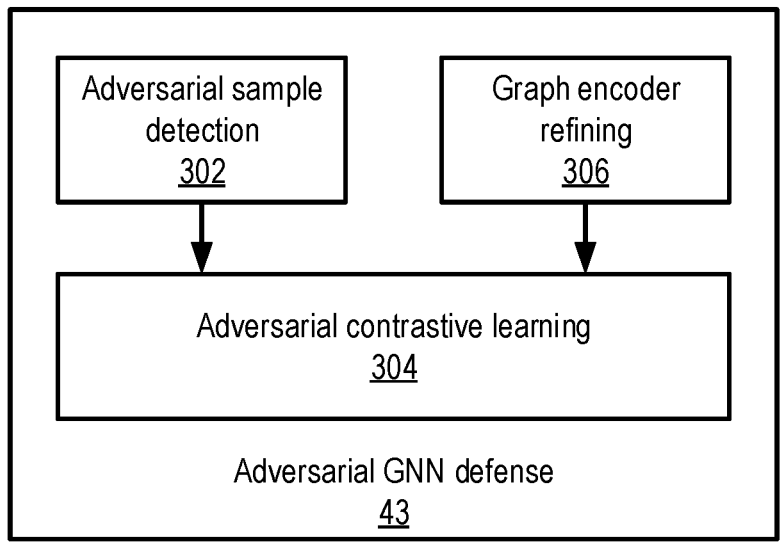
FIG. 3 is a block/flow diagram directed to an adversarial defense process that generates adversarial samples and uses them to train a machine learning model, in accordance with an embodiment of the present invention.

Referring now to FIG. 3, additional detail on the adversarial GNN defense 43 is shown. Adversarial sample detection 302 leverages adversarial training to improve the robustness of detectors, by using adversarial samples. These samples may be generated by, e.g., gradient-based adversarial attacks. Adversarial contrastive learning 304 models the graph adversarial learning as a min-max optimization, to overcome the discrete unknown adversarial space problem, leveraging the high-level graph representation as auxiliary information to regularize the node representation learning. Graph encoder refinement 306 addresses the vulnerabilities in the aggregator and the updater of a GNN encoder by corresponding refining processes.

In general, a GNN can be a neural network parameterized function that leverages both graph structure and node features to learn the representation of a node/graph. A particular form of GNN is contemplated herein, as a graph convolution network, which may aggregate neighbors of a node using convolution operations. The parameters of a GNN may be trained in a supervised manner, with the aim being to learn a new representation of a node, which can be used to predict the node label.

During an adversarial attack, the graph is maliciously transformed through a perturbation function to create a perturbed graph G', such that the performance of the trained GNN model drops significantly. To prepare the model for such attacks, the present embodiments refine the graph in block 306 using adversarial samples that simulate an adversarial attack.

Figure 4:
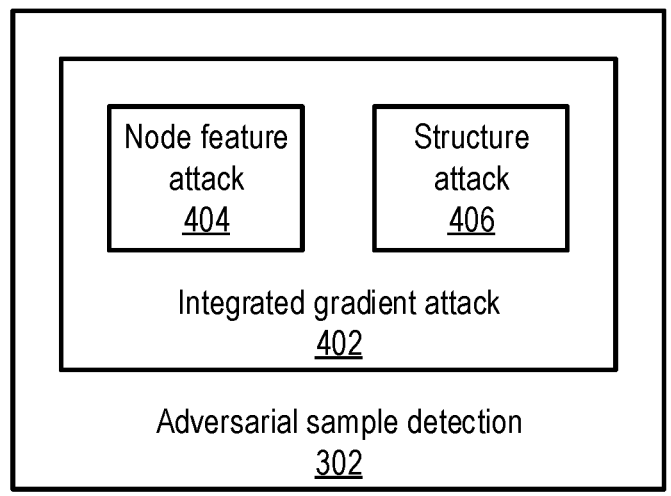
FIG. 4 is a block/flow diagram directed to an adversarial sample detection process that uses structural attacks and node feature attacks to perform an integrated gradient attack that identifies perturbations that can be used as adversarial samples, in accordance with an embodiment of the present invention.

Referring now to FIG. 4, additional detail is shown regarding adversarial sample detection 302. To train an adversarial sample detector on graph data, speculated adversarial instances may be included as part of the training data. However, these samples may be limited in number, and hard to obtain, due to the unknown discrete adversarial space. To address this, the present embodiments may use a classifier that is built upon a large number of known-benign samples, and a smaller number of known-malicious samples. A graph integrated gradient attack 402, specifically designed for graph-typed data, can be used to generate the adversarial samples, which can effectively adjust the decision boundary of the classifier to detect the unknown new adversarial samples. In this way, the robustness of the classifier can be enhanced.

Adversarial attacks against machine learning systems involve supplying doctored samples that change the behavior of the machine learning model. Adversarial instances can have various changes to evade detection, based on the attack strategy. For graph type data, there are attack options that compare with non-graph data, since the latent representation of a sample depends on itself, as well as on the sample's neighborhood. Attack perturbation can therefore be targeted at a node attribute 404, to the graph structure 406, or both. When the attack target is fixed, there are also different types of adversarial approaches. For example, gradient attacks demonstrate a strong attack ability, and are difficult to defend against. Gradient attacks exploit gradients of the loss function, or the gradients of the model output, with respect to the input data, to generate adversarial samples.

In general, both graph structure and node features can be represented with binary values, for example characterizing a connection between nodes with a '1', and representing the fact that a node has a particular feature or attribute with a '1'. A perturbation can therefore flip either of these representations, from a 1 to a 0, or from 0 to a 1.

The present embodiments compute integrated gradients of a prediction score for a target class. The integrated gradients are then used as metrics to measure the priority of perturbing specific features or edges in a graph G. For example, if the perturbation adds or removes an edge from G, then the prediction score for the target class will change. The edge and feature values are considered, and only the scores of possible perturbations are computed. Only the importance of adding edges may be computed, if the edge did not exist before. For a feature or an edge with a high perturbation priority, the value may be perturbed simply by flipping it to a different binary value.

After the effective graph adversarial samples are generated in block 402, they can be used to augment the set of anomaly examples, and to retrain a classifier of the adversarial sample detection. The classifier may thus be trained with a mixture of original samples and adversarial samples, with an overall loss function that may be defined as:

$$\hat{\mathcal{L}} = \beta \mathcal{L}(f_{GNN}, G, y) + (1-\beta) \sum_{v^* \in V^*} l(f_{GNN}, v^*, 1)$$

where L and l measure dataset-level and instance-level classification errors, respectively, where β controls trade-off between original samples and adversarial samples. The label in the second term is fixed as 1, since these refer to the anomalies. The generated adversarial samples are expressed as v* in a set of such samples V*.

In some embodiments, given a graph $g^{(0)} = (X^{(0)}, A^{(0)})$, with node features $X^{(0)}$, corresponding node labels $y^{(0)}$ and A, a classifier $f^{(0)}$ can be trained to distinguish between benign and anomalous nodes. Adversarial samples can be generated, and a perturbed graph $G^1 = (X^{(1)}, A^{(1)})$ can be constructed. The labels of an attacked node are changed from benign to anomaly. Based on the perturbed graph $G^1$, a new classifier $f^{(1)}$ may be trained. After a number of iterations (e.g., up to a predetermined maximum), the final classifier is selected as the adversary-resistant classifier.

To generate perturbations, an integrated gradient attack can be used. For a given model $f: \mathbb{R}^n \to [0,1]$, with $x \in \mathbb{R}^n$ being the input and x' being the baseline, a straight-line path from x' to the input x provides gradients by accumulating all of the gradients at all points along the path. The integrated gradients for the $i^{th}$ feature of x may be defined as:

$$IG_i(f(x)) := (x_i - x_i') \int_{\alpha=0}^{1} \frac{\partial f(x' + \alpha x(x-x'))}{\partial x_i} d\alpha$$

where α is an interpolation constant for perturbing features.

For a GNN model, the attack direction for a target node t includes the adjacency matrix A and the feature matrix X. The integrated gradients can be determined for the priority function J(A,X,t) for a node t, with respect to an input I. For a feature attack, then, I=X, and for a structure attack, I=A.

An all-zero or all-one feature/adjacency metric can be used to represent the perturbation. While removing a specific edge or setting a specific feature from 1 to 0, the adjacency matrix A and feature matrix X can be set to all-zero, to describe the overall change pattern of the target function, while gradually adding edges/features to the current state of A and X to an all-one matrix. To keep the direction of gradients consistent, the integrated gradient for a structure attack may be defined as:

$$IG_i(f^t(X, A))[i, j] = \begin{cases} (A_{ij} - 0) \sum_{k=1}^{m} \dfrac{\partial f\left(\frac{k}{m}(A_{ij} - 0)\right)}{\partial A_{ij}} \cdot \dfrac{1}{m}, & \text{for removing an edge} \\ (1 - A_{ij}) \sum_{k=1}^{m} \dfrac{\partial f\left(\frac{k}{m}(1 - A_{ij})\right)}{\partial A_{ij}} \cdot \dfrac{1}{m}, & \text{for adding an edge} \end{cases}$$

The integrated gradients of the prediction score can be determined for a winning class c with respect to the entries of A and X. The integrated gradients can then be used as metrics to measure the priority of perturbing specific features or edges in the graph G. The importance of adding edges may be considered if the edge does not previously exist. A feature or edge with a high perturbation priority may be perturbed by flipping it to a different binary value.

Figure 5:
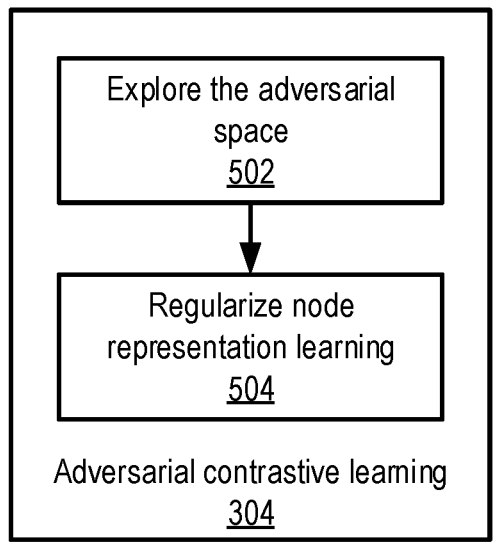
FIG. 5 is a block/flow diagram directed to an adversarial contrastive learning process that uses adversarial samples to perform the training of a machine learning model, in accordance with an embodiment of the present invention.
Figure 6:
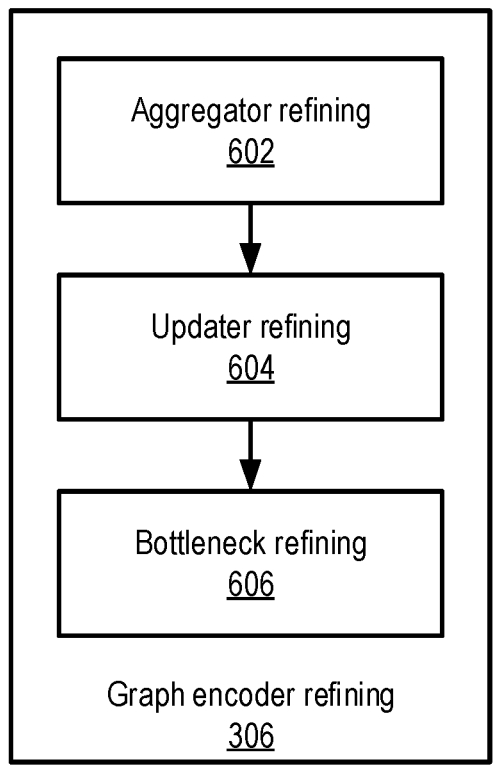
FIG. 6 is a block/flow diagram directed to a graph encoder refining process to improve a model for generating representations of graph samples, in accordance with an embodiment of the present invention.

Referring now to FIG. 5, additional detail is shown for adversarial contrastive learning 304. Adversarial contrastive learning 304 is used to generate good adversarial graph samples. An objective function for contrastive learning can be expressed as:

$$L = E_{x^+, y^+, y^-}[l(x^+, y^+, y^-)]$$

where $(x^+, y^+)$ indicates a positive data pair, and $(x^+, y^-)$ indicates a negative data pair. The function $l(x^+, y^+, y^-)$ scores a positive tuple $(x^+, y^+)$ against a negative tuple $(x^+, y^-)$, and $E_{(x^+, y^+, y^-)}$ represents the expectation with respect to the joint distribution over the positive and negative samples.

Negative sampling is independent of the positive label. Graph embedding may adopt a noise contrastive estimation to approximate a probability of a negative tuple, $p(y^-|x^+)$, using a noise distribution $p_n(y)$. To address these considerations, the objective function can be rewritten as:

$$\mathcal{L} = E_{p(x^+)}[E_{p(y^+|x^+)} s(x^+, y^+) - E_{g(y|x)} s(x^+, y^-)]$$

where $p(x^+)$ is the probability of a positive sample, $p(x^+|y^+)$ is the probability of a positive tuple, $s(x^+, y^+)$ measures a correlation between x and y, and g(y|x) is a generator under a conditional distribution that may be defined based on a specific sampling distribution, such as a uniform distribution.

The objective function can then be optimized in a min-max adversarial learning manner as follows:

$$\min_S \max_G \{E_{p(y^+|x^+)}[\log S(x, y)] + E_{g(y|x)}[\log(1 - S(G(x^+ | y^-)))]\}$$

This formulation includes a discriminator function S and an adversarial sample generator function G. Contrasted to a generative adversarial network (GAN), which generates adversarial samples that are close to the original samples, the present generator function G may generate adversarial samples as hard negative samples. These hard negative samples can help the system to learn a better discriminator for distinguishing the positive and negative pairs. The functions S and G are trained in a joint manner, adjusting the parameters of G to maximize $\log(1-S(G(x^+|y^-)))$, and adjusting the parameters of S to minimize log S(x,y). The functions S and G may be implemented as feed forward neural networks.

There may be no constraint for the generator G, and the generator may further not be tailored to the graph data. This can cause suboptimal quality in the generated adversarial samples, since the adversarial latent space cannot be effectively explored. To counter this, the present embodiments may use a conditional generator configuration, which extends a conditional model, where the generator and discriminator are both conditioned on some extra information. The extra information can be any kind of auxiliary information, such as class labels or data from other modalities.

The condition may be realized by feeding extra information into both the discriminator and the generator as an additional input layer. A high-level graph representation (for example, expressed as graph embedding $h_G$) can be considered as a global constraint to regularize the node representation learning in block 504. Global-level representations, such as graph embedding, are less sensitive to adversarial perturbation than local-level representations, such as node embedding. As a result, the high-level graph representation can be used to guide the robust learning of local node representations. The objective function for adversarial contrastive learning then becomes:

$$\min_S \max_G \{E_{p(y^+|x^+)}[\log S(h_v^{(final)} | h_G)] + E_{g(y|x)}[\log(1 - S(G(h_v'^{(final)} | h_G')))]\}$$

where $h_v^{(final)}$ and $h'_G$ are node and graph embeddings from the generated adversarial samples $G'=(V', \varepsilon', X')=P(G)$, and where $P(G)$ is a perturbation function.

A readout function can be used to obtain the graph embedding. Given the node representations $\{h_v^{(final)}\}_{v \in V}$ of graph G, the readout function performs a mean pooling, followed by a nonlinear mapping, as follows:

$$h_G = \text{Readout } (h_v^{(final)} | v \in v) = \sigma\left(W_r\left(\frac{1}{n}\sum_{l=1}^n h_l^{(final)}\right)\right)$$

where σ represents the sigmoid function, $W_r$ represents a trainable linear mapping matrix, and n represents the number of nodes within the graph. A pooling function can be used to determine the high-level representation in a convolutional neural network (CNN). A mean pooling operation generates a representation that is more stable and less sensitive to small-scale adversarial attacks.

For the discriminator, a mutual information estimator (MIE) can be used to jointly model the local and global graph representations via a bilinear scoring function:

$$S(h_v^{(final)}|h_G) = \text{MIE}(h_v^{(final)}, h_G) = \sigma(h_v^{(final)} W_D h_G)$$

where $\text{MIE}(h_v^{(K)}, h_G)$ represents the mutual information between the node embedding and the graph embedding, $W_D$ is a trainable scoring matrix, K is a number of hops, and σ is the sigmoid function.

In block 306, graph encoder refining addresses the challenge of the intrinsic architecture of GNNs. An aggregator makes up the first component of some GNNs, leveraging the graph structure to improve the GNN performance by aggregating neighborhood information around a node. However, due to graph properties like homophily, the representation of a single node can easily be affected by its local context. As a result, attackers can compromise a node's prediction, without directly changing its features or edges.

Neighborhood aggregators of GNNs may include sum, max, and mean functions. The sum aggregator sums up the features within the neighborhood $N_0$ to capture the full neighborhood. The max aggregator generates the aggregated representation by element-wise max-pooling. It captures neither the exact structure, nor the distribution of the neighborhood $N_v$. As the size of the neighborhood $N_v$ can vary from one node to the next, the mean aggregator averages out individual element features. As contrasted to the sum and max aggregators, the mean aggregator can capture the distribution of the features in the neighborhood $N_v$.

Adversarial attacks are generally stealthy, and can only make small-scale modifications to the graph data. An aggregator may be robust to such subtle perturbations in two exemplary ways: value and expressive power. For value robustness, among the three aggregators, the max aggregator is very sensitive to distinct value modifications, for example by adding a new neighbor of a different class, with a large value. In contrast, the sum and mean aggregators are less sensitive to small-scale value modifications and, thus, are more robust to adversarial attacks. Different neighborhood sizes for each node may result in different denominators for the mean aggregator, but the same denominator for the sum aggregator. In this case, the mean aggregator would be more robust. For expressive power robustness, the sum aggregator generally has more expressive power than the mean aggregator, and is therefore more sensitive to structural changes.

The present embodiments therefore may refine the sum or max aggregator in block 602 by aggregating the neighborhood in a mean pooling manner, instead of using sum or max pooling. This aggregation can be defined as follows:

$$a_v^{(k)} = \text{Aggregator}_{mean}^{(k)}(\{h_u^{k-1} : u \in \mathcal{N}_v\}) = \text{ReLU}\left(W^{(k)} \frac{1}{|\mathcal{N}_v|}\sum_{u \in \mathcal{N}_v} h_u^{(k-1)}\right)$$

where k is an index of the iteration/layer, $|\mathcal{N}_v|$ is the cardinality of the neighborhood of node v, $a_v^{(k)}$ is the result of the mean aggregation, $W^{(k)}$ is a trainable mapping matrix, and ReLU represents a rectified linear unit non-linear gating function.

A GNN updater helps to compute a new representation of each node. Some GNN methods, such as graph convolutional networks (GCNs), simply use the aggregated representation as the new representation for each node. In this case, the node can be updated as follows:

$$h_v^{(k)} = \text{Updater}^{(k)}(a_v^{(k)}) = a_v^{((k))}$$

Other GNNs may leverage the skip-connection to combine the current aggregated representation with the updated representation from the last iteration, such that each node may be updated as:

$$h_v^{(k)} = \text{Updater}^{(k)}(a_v^{(k)}) = [a_v^k; h_v^{(k-1)}]$$

where [.;.] represents a feature concatenation operation. This skip-connection approach gathers the representation from a predecessor layer and drops the rest of the intermediate representations during information propagation within k-hop neighbors. However, stacking multiple such layers could propagate noisy or adversarial information from an exponentially increasing number of expanded neighboring members.

To address this, the present embodiments refine the updater in block 604 in a dense-connected style. The intermediate representations are kept and fused together to compute a recent-layer representation. In this manner, the recent layer is connected with all previous representations, allowing the subsequent layer to selectively, but adaptively, fuse structure information from different hops. Consequently, the robustness can be improved for deep GNNs. The dense-connected updater can be expressed as follows:

$$h_v^{(k)} = \text{Updater}^{(k)}(a_v^{(k)}) = [a_v^{(k)}; h_v^{(k-1)}; h_v^{(k-2)}; \ldots; h_v^{(1)}]$$

The GNN can be constrained to map node representations in a non-linearly low-dimensional space, for example using bottleneck refining. This can include bottleneck mapping, followed by a non-linear mapping, as discussed below.

The adversarial vulnerability of neural networks decreases as the input dimensionality increases. However, real input data is often not truly high-dimensional. The data in a high-dimensional space can be readily embedding into a lower dimensional space, which is often done for improved effectiveness and efficiency. As such, the present embodiments may perform dimensionality reduction on an input.

The present embodiments may therefore use bottleneck refinement in block 606 to add a bottleneck perceptron after the last $\text{Updater}^{(k)}$, to enforce the output dimensionality of the GNN as being lower than that of the input. The bottleneck perceptron can be expressed as follows:

$$h_v^{(final)} = B\text{Percep}(h_v^{(K)}) = \text{ReLU}((W_p)h_v^{(K)})$$

where $W_p$ is a trainable mapping matrix map of the final layer of the node representation into the lower-dimensional space, and ReLU represents a rectified linear unit non-linear gating function.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Figure 7:
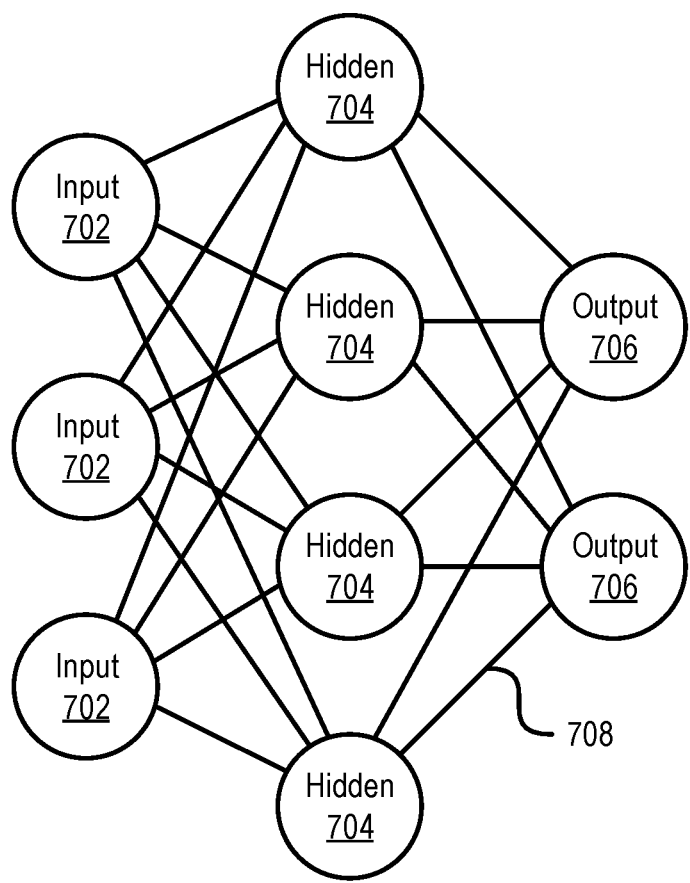
FIG. 7 is a diagram that shows an exemplary high-level artificial neural network architecture, in accordance with embodiments of the present invention.

Referring now to FIG. 7, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 702 that provide information to one or more "hidden" neurons 704. Connections 708 between the input neurons 702 and hidden neurons 704 are weighted and these weighted inputs are then processed by the hidden neurons 704 according to some function in the hidden neurons 704, with weighted connections 708 between the layers. There may be any number of layers of hidden neurons 704, and as well as neurons that perform different functions. There exist different neural network structures as well, such as convolutional neural network, maxout network, etc. Finally, a set of output neurons 706 accepts and processes weighted input from the last set of hidden neurons 704.

This represents a "feed-forward" computation, where information propagates from input neurons 702 to the output neurons 706. Upon completion of a feed-forward computation, the output is compared to a desired output available from training data. The error relative to the training data is then processed in "feed-back" computation, where the hidden neurons 704 and input neurons 702 receive information regarding the error propagating backward from the output neurons 706. Once the backward error propagation has been completed, weight updates are performed, with the weighted connections 708 being updated to account for the received error. This represents just one variety of ANN.

Figure 8:
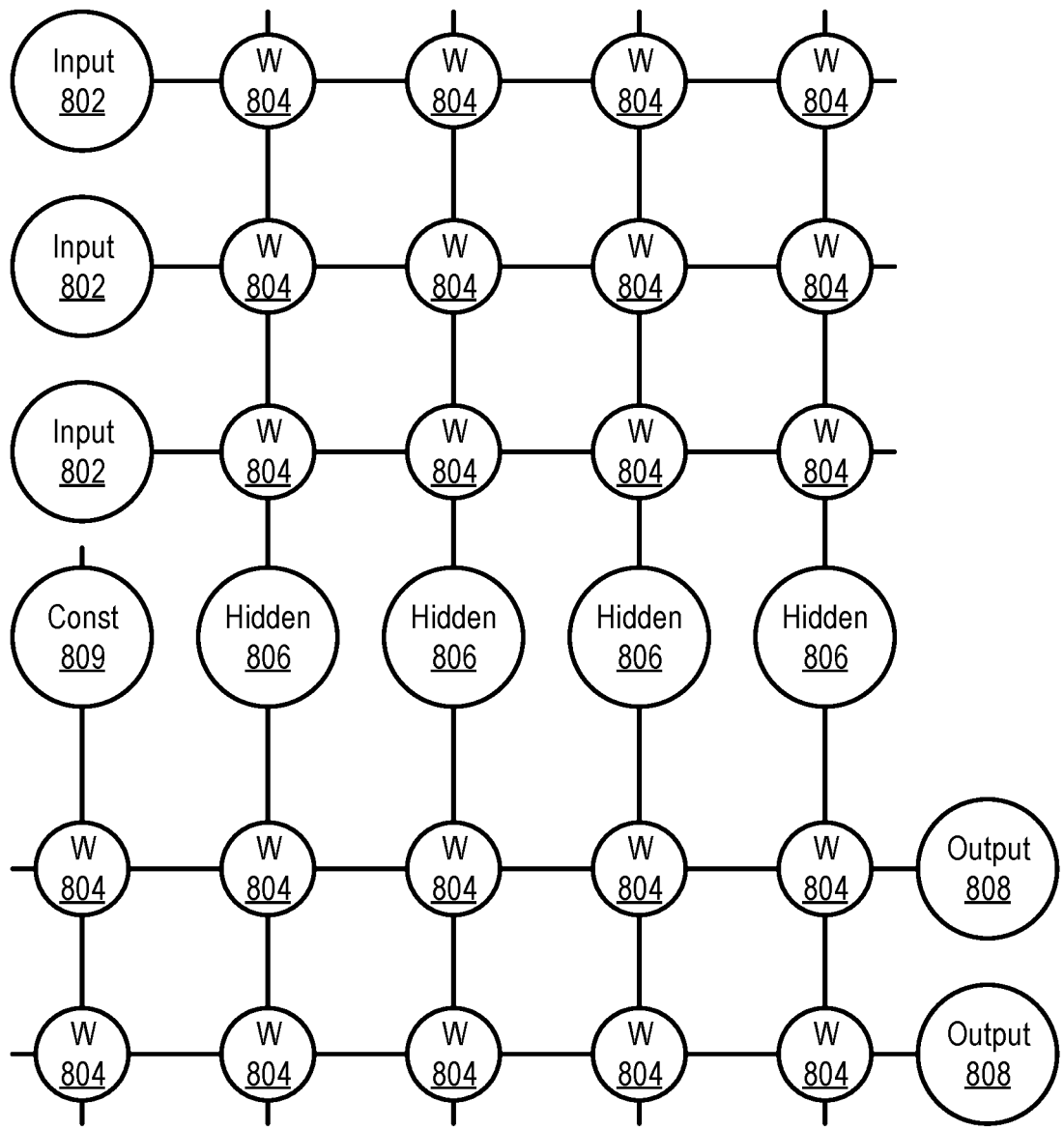
FIG. 8 is a diagram that shows an exemplary artificial neural network architecture, in accordance with embodiments of the present invention.

Referring now to FIG. 8, an ANN architecture 800 is shown. It should be understood that the present architecture is purely exemplary, and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, softmax layers, or any other appropriate type of neural network layer. Furthermore, layers can be added or removed as needed and the weights can be omitted for more complicated forms of interconnection.

During feed-forward operation, a set of input neurons 802 each provide an input signal in parallel to a respective row of weights 804. The weights 804 each have a respective settable value, such that a weight output passes from the weight 804 to a respective hidden neuron 806 to represent the weighted input to the hidden neuron 806. In software embodiments, the weights 804 may simply be represented as coefficient values that are multiplied against the relevant signals. The signals from each weight adds column-wise and flows to a hidden neuron 806.

The hidden neurons 806 use the signals from the array of weights 804 to perform some calculation. The hidden neurons 806 then output a signal of their own to another array of weights 804. This array performs in the same way, with a column of weights 804 receiving a signal from their respective hidden neuron 806 to produce a weighted signal output that adds row-wise and is provided to the output neuron 808.

It should be understood that any number of these stages may be implemented, by interposing additional layers of arrays and hidden neurons 806. It should also be noted that some neurons may be constant neurons 809, which provide a constant output to the array. The constant neurons 809 can be present among the input neurons 802 and/or hidden neurons 806 and are only used during feed-forward operation.

During back propagation, the output neurons 808 provide a signal back across the array of weights 804. The output layer compares the generated network response to training data and computes an error. The error signal can be made proportional to the error value. In this example, a row of weights 804 receives a signal from a respective output neuron 808 in parallel and produces an output which adds column-wise to provide an input to hidden neurons 806. The hidden neurons 806 combine the weighted feedback signal with a derivative of its feed-forward calculation and stores an error value before outputting a feedback signal to its respective column of weights 804. This back propagation travels through the entire network 800 until all hidden neurons 806 and the input neurons 802 have stored an error value.

During weight updates, the stored error values are used to update the settable values of the weights 804. In this manner the weights 804 can be trained to adapt the neural network 800 to errors in its processing. It should be noted that the three modes of operation, feed forward, back propagation, and weight update, do not overlap with one another.

Figure 9:
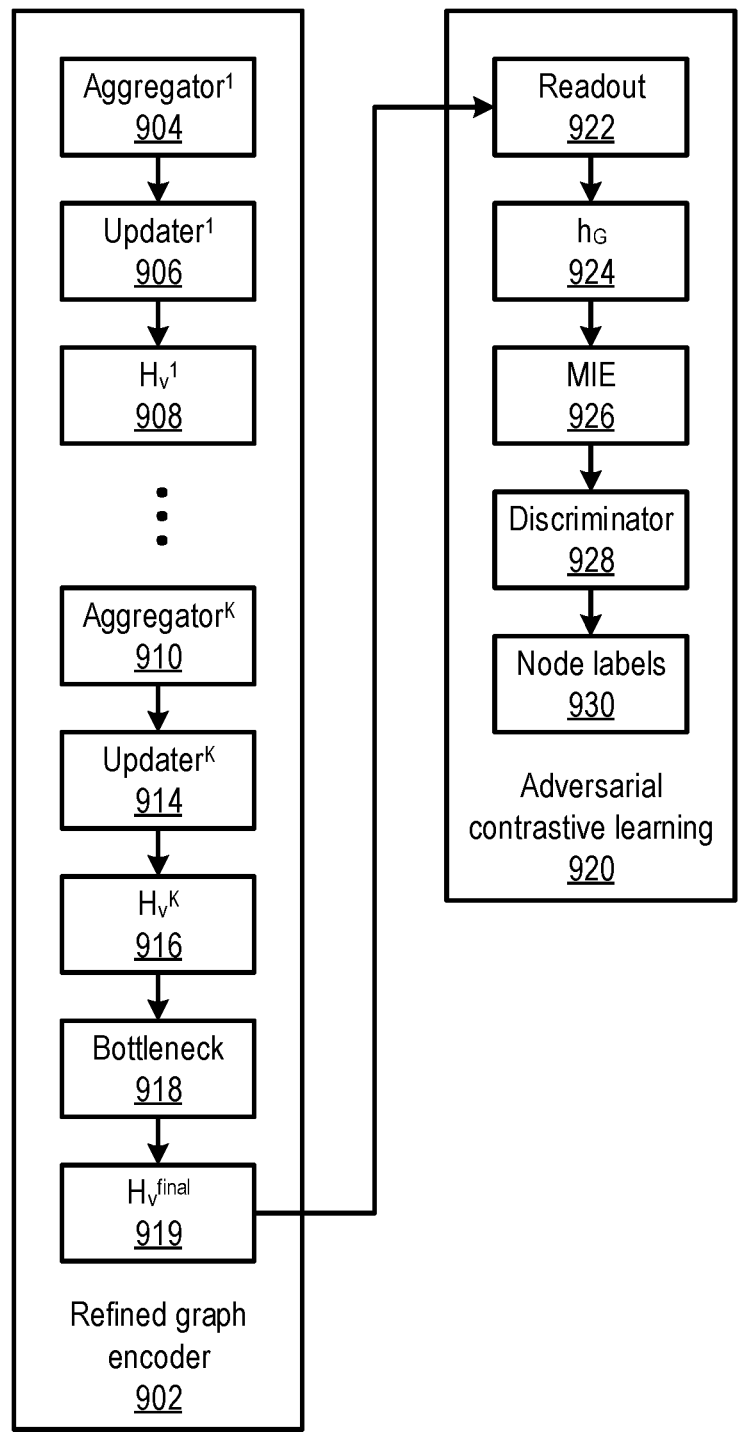
FIG. 9 is a block/flow diagram that shows an exemplary graph neural network model structure in accordance with an embodiment of the present invention.

Referring now to FIG. 9, the overall structure of the GNN is shown. The refined graph encoder 902 accepts graph samples (including original samples and perturbed adversarial samples) as an input. The samples are processed by a series of K aggregation/updating steps, with a first aggregator 904 aggregating the neighbors of an unlabeled node and first updater 906 determines updated representations of each node, producing a representation $h_v^1$ 908. This is repeated with additional aggregation/updating stages, producing a new representation at each stage. A final, $K^{th}$ stage includes a $K^{th}$ aggregator 910 and a $K^{th}$ updater 914, producing a $K^{th}$ representation 916. Each aggregator may be implemented as a mean aggregator, and each updater may be implemented as a densely connected updater. A bottleneck layer 918 limits the dimensionality of the representation, producing final representation 919.

The refined graph encoder 902 is used on a variety of samples, including original samples and perturbed adversarial samples. The refined graph encoder 902 generates respective representations for the samples, and these representations are provided together to adversarial contrastive learning 920. A readout layer 922 obtains the graph embedding 924 of each of the input final representations from the respective samples. An MIE 926 jointly models local and global representations, based on both the input final representation and the graph embedding. The output of the MIE 926 is processed by discriminator to determine whether the unlabeled node v is normal or anomalous, thereby providing a node label 930.

Figure 10:
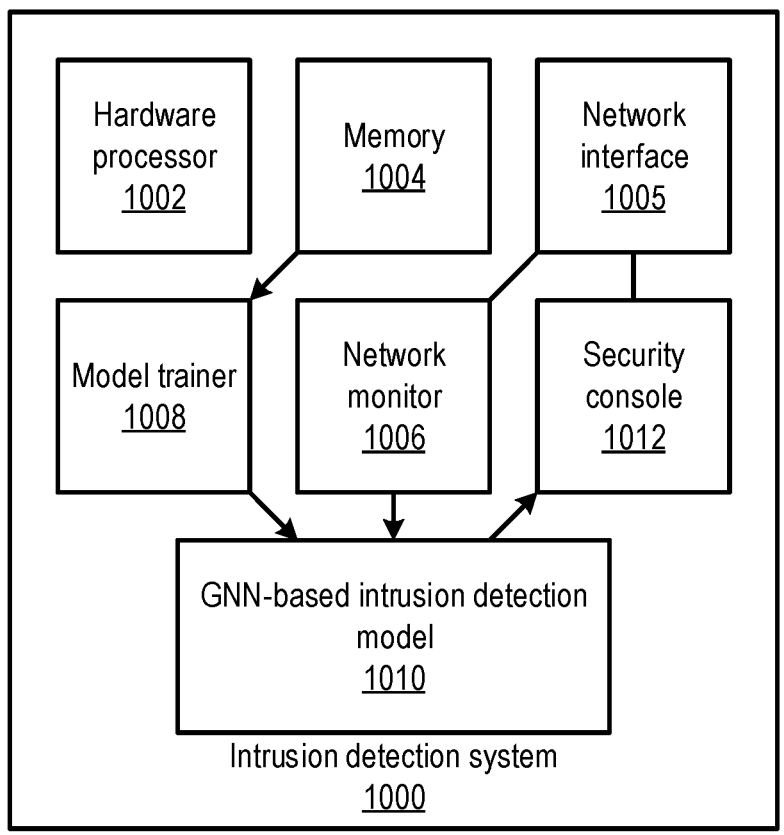
FIG. 10 is a block diagram of an intrusion detection system that uses a graph neural network intrusion detection model, trained using adversarial samples, to identify and respond to anomalous network nodes in a manner that is resistant to adversarial training attacks.

Referring now to FIG. 10, an intrusion detection system 1000 is shown. The system 1000 includes a hardware processor 1002 and memory 1004. A network interface 1005 communicates with one or more devices on a computer network using any appropriate wired or wireless communications medium and protocol.

In addition, a number of functional modules are included that may, in some embodiments, be implemented as software that is stored in memory 1004 and that is executed by hardware processor 1002. In other embodiments, the functional modules may be implemented as one or more discrete hardware components in the form of, e.g., application specific integrated chips or field programmable gate arrays. Still other embodiments may use both hardware and software forms for different functional modules, or may split the functions of a single functional module across both hardware and software components.

A network monitor 1006 collects information from agents at various hosts using the network interface 1005. This can include historical event information, including process-level events and network events, as well as real-time event information. A GNN-based intrusion detection model 1010, according to the present embodiments, determines whether a particular host, system, or agent on the network is behaving in an anomalous fashion, using inputs from the network monitor 1006.

Based on a determination by the model 1010, a security console 1012 performs manual or automated security actions in response to the ranked alerts and alert patterns. In particular, the security console 1012 may have rules and policies that trigger when an anomaly score for a host exceeds a threshold. Upon such triggers, the security console 1012 may automatically trigger security management actions such as, e.g., shutting down devices, stopping or restricting certain types of network communication, raising alerts to system administrators, changing a security policy level, and so forth, and may implement such actions by communicating through the network interface 1006. The security console 1012 may also accept instructions from a human operator to manually trigger certain security actions in view of analysis of the anomalous host.

Figure 11:
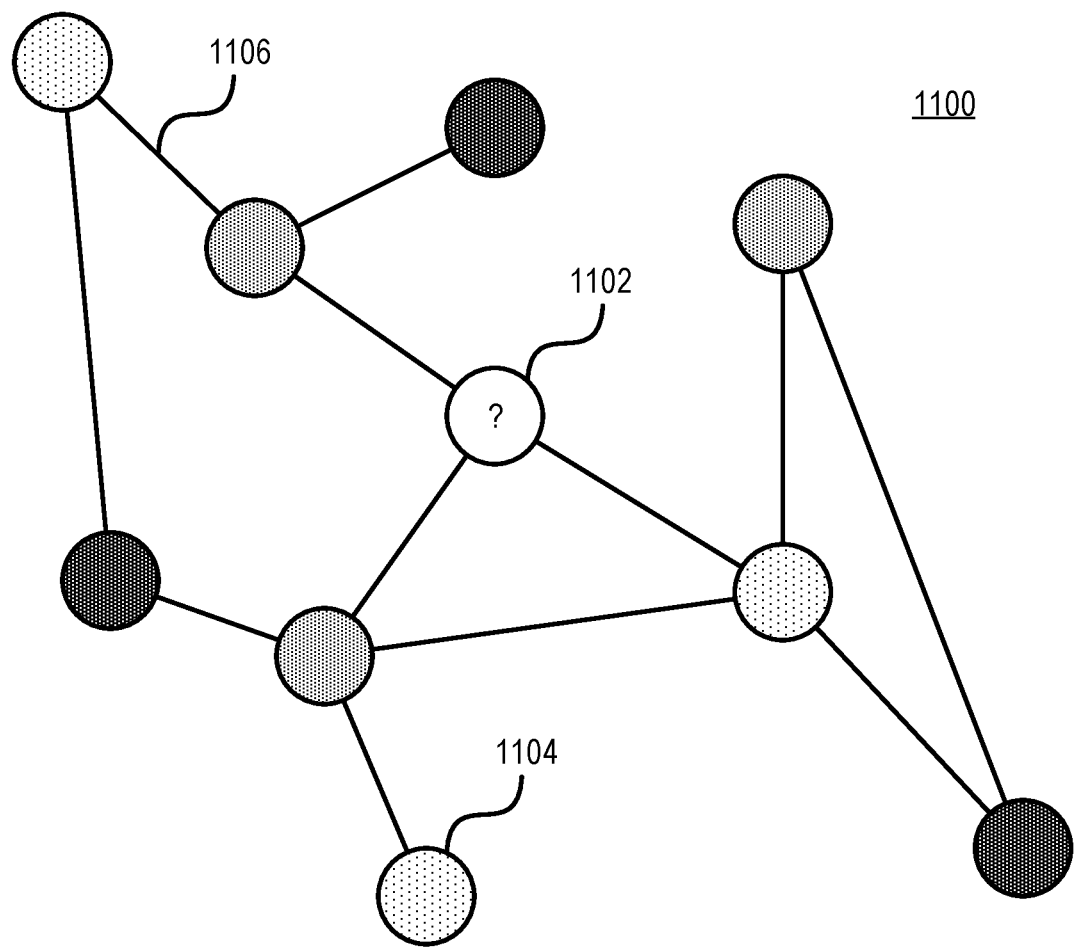
FIG. 11 is a diagram of a network graph that includes labeled and unlabeled nodes, in accordance with an embodiment of the present invention.

Referring now to FIG. 11, an exemplary network graph 1100 is illustratively depicted in accordance with one embodiment of the present invention. The graph 1100 captures the topological structure of a dynamic network of objects, represented as nodes 1104. As noted above, in some embodiments, such objects may represent physical objects in, e.g., a physical system. In some embodiments, the objects 1104 may represent atoms or ions in a molecule. In yet other embodiments, the objects 1104 may represent computing systems within a communications network. It should be understood that the illustrated graph is intended to be purely illustrative, and that the structure shown therein is not intended to be limiting in any way.

Edges 1106 between the nodes 1104 represent connections between the objects. For example, they may represent a chemical bond between two atoms, a structural connection between two physical objects, or a network communication between two computer systems. These connections develop and change over time, such that an edge 1106 between two nodes 1104 may disappear from one measurement to the next, while a new edge 1106 may be formed between two different nodes 1106 in the same interval.

Each node 1104 in the network 1100 includes one or more attributes or labels. These labels identify some characteristic of the node 1104. For example, in a complex molecule, individual atoms and ions may be labeled as contributing to a pharmacological effect of the molecule, with some nodes 1104 being labeled as contributing, and other nodes 1104 being labeled as not contributing. In a computer network environment, the nodes 1104 may be labeled according to roles within the network (e.g., server vs workstation), or according to conformance to expected behavior (e.g., normal vs anomalous). The labels may include, for example, an attribute vector, denoting multiple attributes of the node respective 1104.

An initial set of edges 1106 may be provided, for example in the form of a physical record, or may be inferred by pairwise regression of output data from pairs of objects 1104. Edges 1106 can be weighted or unweighted, directed or undirected. However, label and edge information may not be available for every node 1104 and for every attribute of every node 1104. Thus, some nodes 1102 may be partially or entirely unlabeled at the outset.

The present embodiments identify the importance of different factors, such as neighboring nodes 1104, attributes, and topology, that influence the labels of a node. Topology and attribute information is adaptively selected for integration over the evolution of the graph 1100 through time.

Given a sequence of attributed graphs 1100 for a set of nodes 1104, where each node 1104 has a unique class label over a period of time, the present embodiments predict the labels of unlabeled nodes 1102 by learning from the labeled ones. In some embodiments, this can be used to detect anomalous network traffic. Given a network's historical records, a sequence of communication graphs can be constructed, where each node is a computational device and each edge indicates a communication. Each node can be associated with characteristic features, such as a network address (e.g., an IP address or MAC address) and a device type. The present embodiments can then classify the nodes into an anomalous class and a normal class, using the labeled historical data. The labeled network graph can then be used to identify anomalous behavior that may, for example, be indicative of a network failure or intrusion. The anomalous behavior can then be corrected.

In another application, brain graphs can be built to show the functional connectivity of widespread brain regions, by statistical analysis of fMRI and other signals. In a brain graph, each node indicates a particular region and each edge represents functional connectivity between two regions. To monitor the activity of the brain, a sequence of brain graphs can be constructed. In this context, node classification can be used to assign each node to a category of activity, such as language processing or sports. The brain graph can then be used to identify abnormalities in brain function, in preparation for surgery or treatment.

Figure 12:
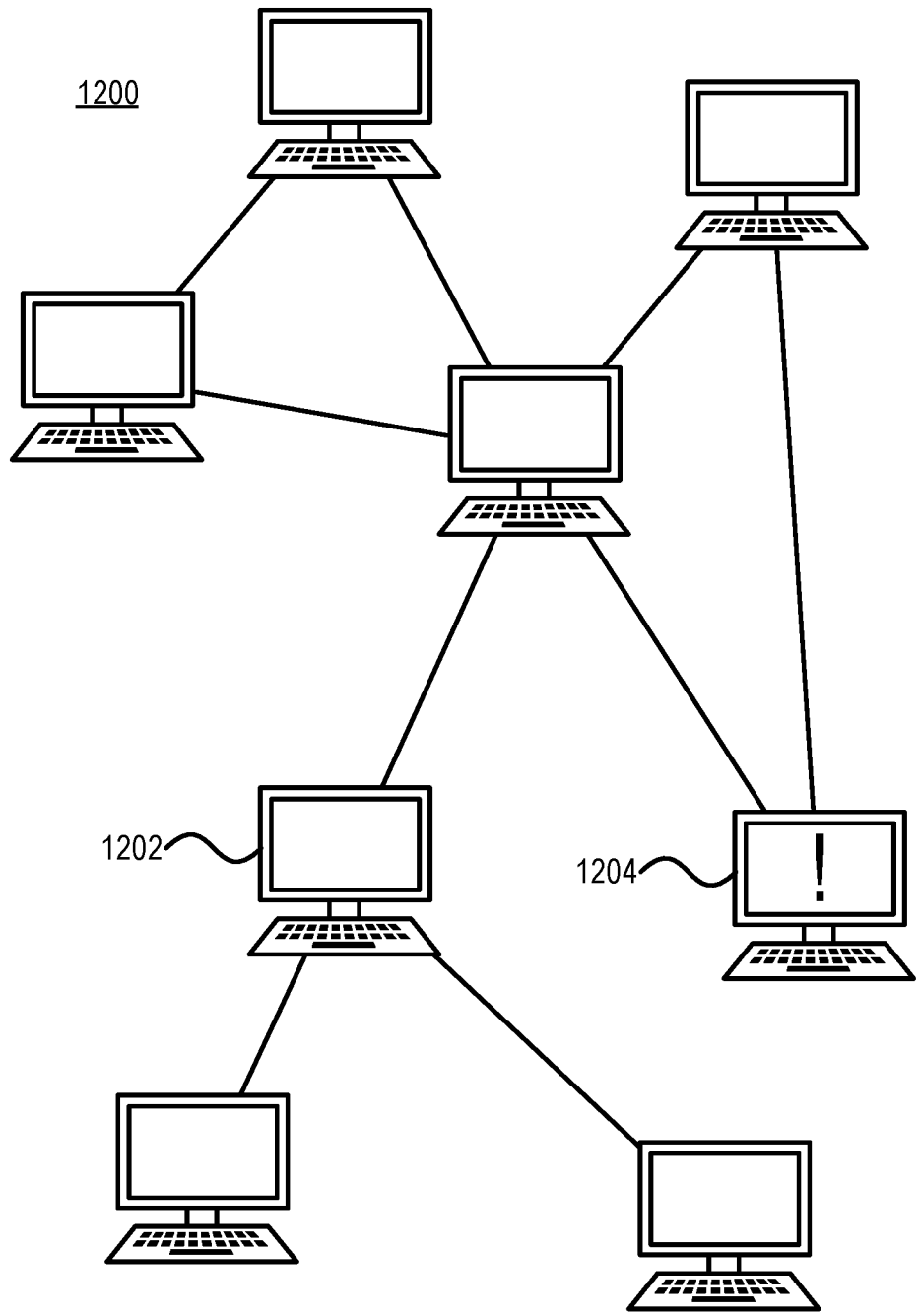
FIG. 12 is a diagram of an exemplary computer network, including at least one system that shows anomalous activity, in accordance with an embodiment of the present invention.

Referring now to FIG. 12, an embodiment is shown that includes a network 1200 of different computer systems 1202. The functioning of these computer systems 1202 can correspond to the labels of nodes in a network graph that identifies the topology and the attributes of the computer systems 1202 in the network. At least one anomalous computer system 1204 can be identified using these labels, for example using the labels to identify normal operation and anomalous operation. In such an environment, the intrusion detection system 1000 can identify and quickly address the anomalous behavior, stopping an intrusion event or correcting abnormal behavior, before such activity can spread to other computer systems.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for detecting and responding to an intrusion in a computer network, comprising:
    generating an adversarial training data set that includes original samples and adversarial samples, by perturbing one or more of the original samples with an integrated gradient attack to generate the adversarial samples, including determining an integrated gradient for a perturbation to determine how much the perturbation will affect a prediction outcome for an unlabeled node;
    encoding the original and adversarial samples to generate respective original and adversarial graph representations, based on node neighborhood aggregation;
    training a graph-based neural network to detect anomalous activity in a computer network, using the adversarial training data set; and
    performing a security action responsive to the detected anomalous activity.

2. The method of claim 1, wherein the original samples include graph information.

3. The method of claim 2, wherein each adversarial sample includes a copy of one of the original samples, with an edge added or removed.

4. The method of claim 1, wherein encoding the original and adversarial samples includes a plurality of stages, with each stage including a neighborhood aggregation and a representation update.

5. The method of claim 4, wherein the neighborhood aggregation includes a mean aggregation.

6. The method of claim 4, wherein the representation update for each stage is based on each output from all previous stages.

7. The method of claim 4, wherein encoding the original and adversarial samples further includes a bottleneck that limits a dimensionality of a final graph representation.

8. The method of claim 1, wherein the security action is selected from the group consisting of shutting down devices, stopping or restricting a type of network communication, enabling or disabling a connection between two devices, raising an alert to a system administrator, and changing a security policy level.

9. System for detecting and responding to an intrusion in a computer network, comprising:
    a hardware processor;
    a memory configured to store a computer program that, when executed by the computer program causes the hardware processor to implement:
        a graph-based neural network model, configured to detect anomalous activity in a computer network;
        a model trainer, stored in the memory and executed by the hardware processor, configured to generate an adversarial training data set that includes original samples and adversarial samples, by perturbing one or more of the original samples with an integrated gradient attack to generate the adversarial samples, including a determination of an integrated gradient for a perturbation to determine how much the perturbation will affect a prediction outcome for an unlabeled node; to encode the original and adversarial samples to generate respective original and adversarial graph representations, based on node neighborhood aggregation; and to train the graph-based neural network to detect anomalous activity in a computer network, using the adversarial training data set; and
        a security console configured to perform a security action responsive to the detected anomalous activity.

10. The system of claim 9, wherein the original samples include graph information.

11. The system of claim 10, wherein each adversarial sample includes a copy of one of the original samples, with an edge added or removed.

12. The system of claim 9, wherein the model trainer is further configured to encode the original and adversarial samples in a plurality of stages, with each stage including a neighborhood aggregation and a representation update.

13. The system of claim 12, wherein the neighborhood aggregation includes a mean aggregation.

14. The system of claim 12, wherein the representation update for each stage is based on each output from all previous stages.

15. The system of claim 12, wherein the model trainer is further configured to use a bottleneck that limits a dimensionality of a final graph representation.

16. The system of claim 9, wherein the security action is selected from the group consisting of shutting down devices, stopping or restricting a type of network communication, enabling or disabling a connection between two devices, raising an alert to a system administrator, and changing a security policy level.

* * * * *